UNITED STATES PATENT OFFICE.

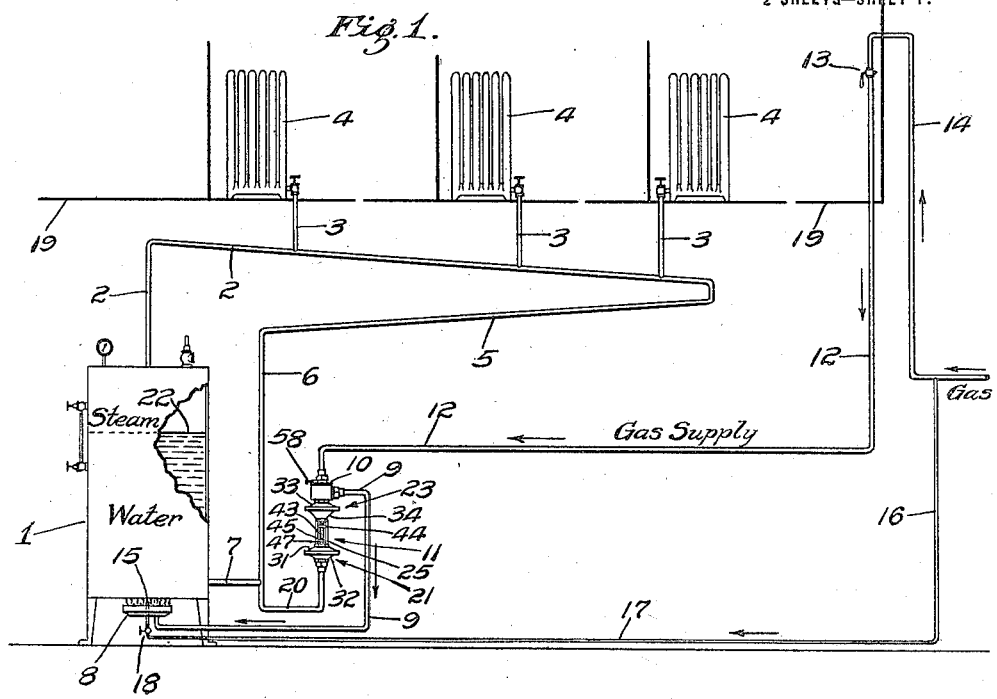
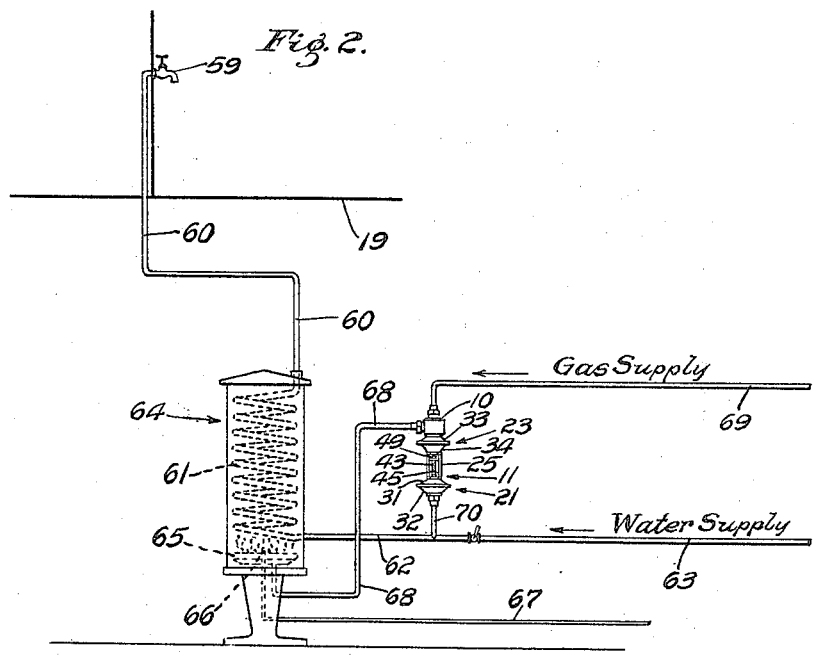

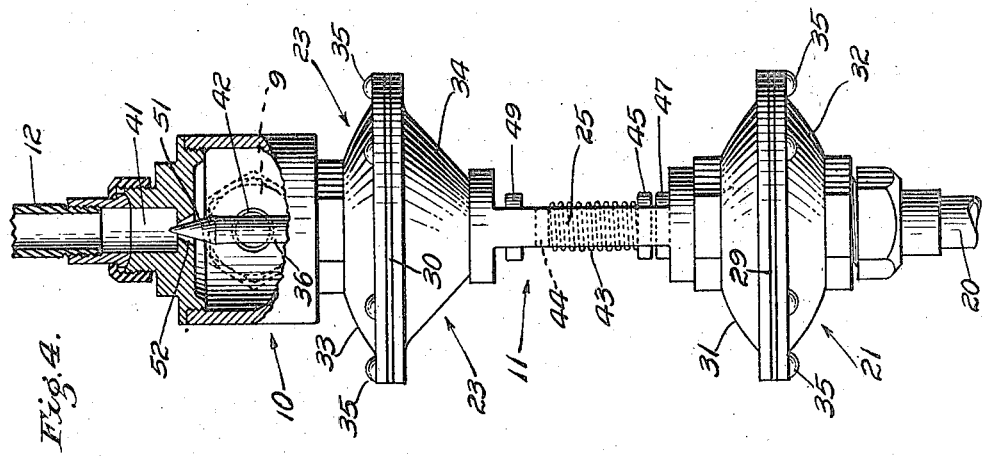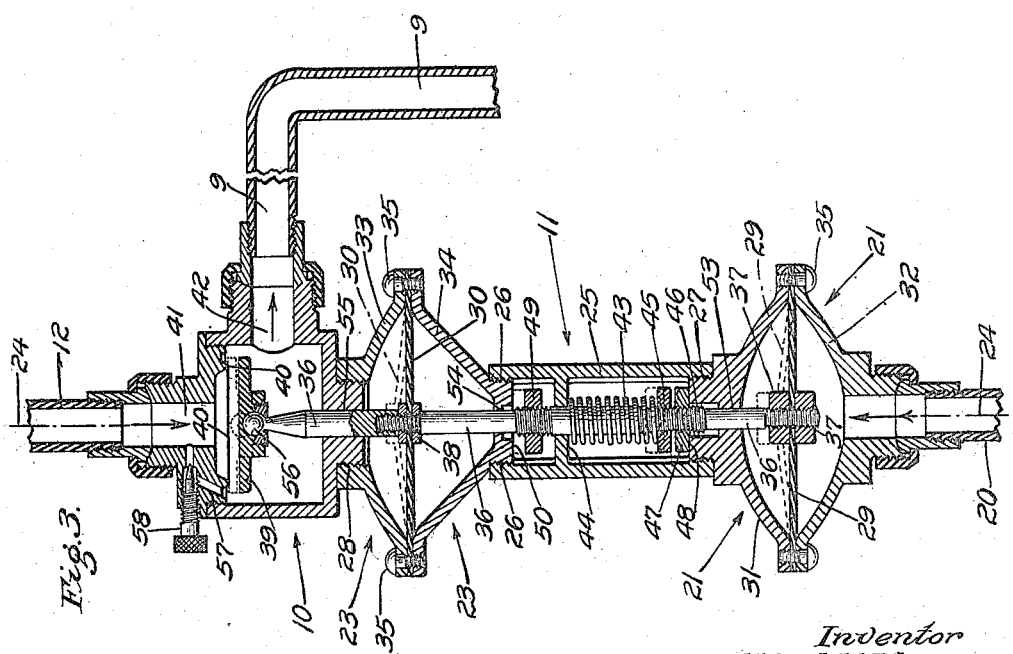

ALFRED H. THOMPSON, OF VENICE, CALIFORNIA.

REGULATOR.

1,240,102.  Specification of Letters Patent.  Patented Sept. 11, 1917.

Application filed April 18, 1913. Serial No. 762,110.

*To all whom it may concern:*

Be it known that I, ALFRED H. THOMPSON, a citizen of the United States, residing at Venice, in the county of Los Angeles and State of California, have invented a new and useful Regulator, of which the following is a specification.

This invention relates to a novel device whereby the amount of gaseous or liquid fuel supplied to a burner may be regulated by the pressure fluctuations in some fluid medium, the latter usually being the medium to which the heat of said burner is applied.

An object of this invention is to produce a device or regulator for the above purpose, which regulator shall be cheap to construct, and durable and serviceable in operation; and which shall be efficient, effective and positive in its internal mechanical operation so as to very delicately proportion the amount of fuel supplied to the burner in accordance with the pressure of the fluid medium.

In devices of this character heretofore proposed and in practical use, when the operating or pressure medium leaked through the diaphragm chamber, said pressure medium would pass into the fuel supply and there was no external indication of such leakage, thus producing objectionable results.

An object of this invention is to overcome such objections and this I do by employing two diaphragms separated by an atmospheric chamber so that if leakage should occur past either diaphragm the pressure medium or fuel, as the case may be, will escape to the atmosphere by way of said atmospheric chamber and thus give external evidence that leakage is taking place.

It is noted that heretofore a single diaphragm has been employed in most instances and where two diaphragms have been employed they were not separated by an atmospheric chamber so that if leakage occurred the effect would be exactly the same as in those devices employing but one diaphragm.

Other objects may appear in consideration of the following detailed description, or by inspection of the accompanying drawings.

The accompanying drawings illustrate the invention.

Figure 1 is a diagrammatic view of a steam heating system, and shows one mode of connecting the regulator when used in such a system.

Fig. 2 is a diagrammatic view of an automatic water heating system, and shows one mode of connecting the regulator when used in such a system.

Fig. 3 is a longitudinal section of the regulator, and shows the details thereof. The valve shown in Fig. 3 is of the type preferably employed when the regulator operates upon gaseous fuel.

Fig. 4 is an elevation showing the regulator partly in section, and said elevation shows the regulator as it appears when rotated ninety degrees around its long axis from the position shown in Fig. 3. The valve shown in Fig. 4 is of the type preferably employed when the regulator operates on liquid fuel.

In order that the conditions under which the regulator operates may be understood from the outset the steam heating system shown in Fig. 1 will now be described. The usual boiler 1, forming a fluctuating pressure source feeds steam into the main 2 from which it is distributed by pipes 3 into the usual radiators 4; and from said radiators the condensate passes back to the boiler through pipes 3, 5, 6 and 7. The boiler is shown to be heated by a gas burner 8 to which gas is supplied by the gas circuit, including pipe 9, valve chamber 10 of the regulator 11, pipe 12, a cock 13, and the commercial gas main 14 forming a low pressure fuel source. A second gas circuit leads from the gas main 14 to burner 8 for the purpose of constantly supporting the pilot flame 15; and this second circuit is shown as comprising pipe 16, pipe 17 and the controlling valve 18. It will be assumed that the boiler 1 and all other apparatus shown beneath the floor line 19 are located in the cellar, while the radiators and valve 13 are located in the upper living rooms of the building. The pilot light 15 may burn constantly, and when the persons in the living rooms desire heat from the system and from the radiators they need merely open hand cock 13, which will permit a large flow of gas to pass through the pipe 12, valve chamber 10 and pipe 9 to the burner 8, where said gas will be automatically ignited by the pilot flame 15, and will proceed to rapidly heat the water in boiler 1 and to set the system into operation. Most steam heating systems such as this are designed to work at a definite normal pressure, and the object of the regulator 11 is to reduce the amount of fuel supplied to burner 8 when the steam pressure rises above normal. By this means fuel economy is accomplished and the system operates under more even and constant conditions. To accomplish the aforesaid purpose, a pipe 20 connects pipe 7 with the diaphragm chamber 21 of regulator 11, and since the water in the boiler normally rises to level 22 the pipe 20 will be filled with relatively cold water, so that the steam pressure may be transmitted from the boiler to the regulator for the purpose of operating the latter. When said pressure as transmitted through pipe 20 exceeds the normal boiler pressure, the regulator through mechanism, hereinafter described, will operate to reduce the gas supplied through valve chamber 10 so that the gas fed to burner 8, and the heat produced by same, may be correspondingly reduced. The gas passage through valve chamber 10 may be either totally or partially cut off according to the excess of fluid pressure in the diaphragm chamber 21; and from this it follows, of course, that the flame of burner 8 may be either totally extinguished or reduced. If the gas pressure has been so great as to necessitate the extinction of said flame, the radiators will dissipate the heat of the system and will thereby reduce said pressure. When said pressure drops below its normal value the regulator will again open the gas supply and the pilot light 15 will re-ignite said supply, and continue the boiler heat and pressure approximately at the normal value.

Turning now to the regulator and its details as generally shown in Figs. 3 and 4, said regulator is seen to comprise a lower diaphragm chamber 21, an upper diaphragm chamber 23, and the valve chamber 10, all of which chambers are substantially in alinement on long axis 24, and which chambers are all rigidly connected as hereinafter described, so as to form a unitary construction. In the form of regulator shown in the figures this connection is effected by having a hollow opensided yoke or atmospheric chamber 25, the upper end of which is threaded to the diaphragm chamber 23 as at 26, and the lower end of which is threaded onto the diaphragm chamber 21 as at 27; and by further having the valve chamber 10 and diaphragm chamber 23 screwed to each other as at 28. Each of the diaphragm chambers 21 and 23 are spanned by any suitable impervious diaphragms 29 and 30, respectively; and said diaphragms are preferably attached within said chambers by clamping the circular edges of said diaphragms between the similar circular edges of the upper and lower bowls 31 and 32 for chamber 21, and bowls 33 and 34 for chamber 23. In each chamber this clamping is effected by the screws 35, which draw the upper and lower bowls tight onto said diaphragm so as to form a gas tight connection between said bowls and diaphragms. The lower diaphragm chamber 21 is suitably connected with pipe 20 through which a column of water from the boiler is directed into the regulator, and whereby the diaphragm 29 is adapted to receive and to be moved by the fluid pressure of said water. A member, in the form of a sectioned stem 36, passes into each of the diaphragm chambers and into the valve chamber, and is moved by and connected with diaphragm 29 as at 37, and is connected with diaphragm 30 as at 38, and is connected with a valve 39 in the valve chamber. When the stem 36 is moved upward it coöperates with valve 39, so as to seat it on the valve seat 40. The valve chamber 10 is provided with a fuel inlet 41 and a fuel outlet 42 to which the pipes 12 and 9, Figs. 1 and 3, are respectively connected, and which inlet and outlet, together with the valve chamber itself, constitute the fuel supply passage through the regulator. It will now be apparent from all of the foregoing that when the fluid pressure on the lower face of diaphragm 29 is excessive, said diaphragm and the sectioned stem 36 will be moved upward and will carry the valve 39 toward the valve seat 40 so as to either totally or partially cut off communication between the fuel inlet and outlet 41 and 42, respectively; and so as to thereby reduce the amount of fuel supplied to burner 8 as previously described. It is clear that the foregoing construction makes provision whereby if the pressure medium should leak past the diaphragm 29 or if the fuel should leak past the diaphragm 30, such pressure medium and fuel would pass through the atmospheric chamber 25 and reveal themselves externally of the device by the sense of sight or smell, as the case may be. For the purpose of again lowering said steam valve and diaphragm as the valve pressure decreases, and for the purpose of offering a definite resistance to the upward motion of said stem, valve and diaphragm as said fluid pressure increases, some suitable means such as will now be described is provided.

This means, as shown, comprises yielding means in the form of a spring 43, which surrounds stem 36; the upper end of said spring being seated against a rigid shoulder 44 formed on the pillar 25, while the lower end of said spring reacts downward onto the nut 45, the latter being adjustable along the threaded portion 46 of stem 36. With this construction it is seen that the spring is adapted to re-act and coöperate with nut 45 and stem 36, so as to transmit a downward force to the diaphragm 29; and it is further seen that this downward force being oppositely directed to the fluid pressure acting on diaphragm 29 will resist the latter and will determine the amount to which the latter is able to raise stem 36 and valve 39 toward the seat 40 at any definite fluid pressure. If the system in which the regulator is operating is a relatively high pressure system, the nut 45 may be screwed upward along the stem so as to increase the compression under which spring 43 operates; and this will result in the diaphragm 29 withstanding a greater fluid pressure before the same moves the stem and valve 36 and 39 upward; or else, if a still greater reaction be required from the relatively light spring 43, a heavier and stiffer spring may be substituted therefor by which the regulator may be adapted to operate in very high pressure systems. In other words, by adjusting the nut 45 so as to put spring 43 under a greater compression, a greater steam pressure will be obtainable in the boiler, Fig. 1, before the regulator will in any way reduce the fuel supply, so that more heat will be constantly fed to the boiler and a higher normal pressure maintained on the system.

The stem 36 is fixed to the diaphragm 30 and the valve 39 and is operable by the diaphragm 29 to move the valve stem toward the valve seat 40 and the arrangement is such that the movement of the valve stem in response to the yielding means 43 will positively open the valve.

It is desirable, however, that some stop be provided, preferably on the stem, so as to relieve the diaphragm from the force of the spring at times when the fluid pressure is light. For this purpose another nut 47 is adjustable along the threaded portion of the stem and is adapted to abut against the rigid shoulder 48 formed on the diaphragm chamber 21. When there is no fluid pressure acting on the diaphragm 29, or when said fluid pressure is below normal, the spring 43 urges stem 36 downward until the nut 47 abuts on shoulder 48. The stem cannot be forced down farther than this, so that nut 47, rather than the diaphragm 29, serves to support the re-action of spring 43; and by thus relieving the diaphragm of said reaction the life and quality of the diaphragm is preserved. In addition to this the nut 47 being somewhat adjustable on stem 36 serves to determine the maximum amount by which valve 39 can be lowered beneath valve seat 40, so that nut 47 in effect determines the maximum amount of fuel which can be fed through the regulator to the burner.

Another nut 49 is also adjustably mounted on a threaded portion of the stem 36, and by abutting shoulder 50 of the diaphragm chamber 23, said nut prevents the stem being driven upward unduly hard by any excessive fluid pressure which may accidentally be applied to the diaphragm 29; and in this manner, said nut prevents the valve 39 from being forced unduly hard onto seat 40. This enables the attendant by adjusting the nut 49 toward the valve 39 to regulate the seating of the valve, that is, to prevent the valve from entirely seating so that where it is desired, a minimized flow of fuel always passes through the valve chamber irrespective of excessive pressure on the diaphragm 29, thus preventing the fire from becoming entirely extinguished.

Where it is not desired to insure such minimized flow the stop 49 may be accurately adjusted to engage the stationary part 34 exactly at the seating of the valve. This obviously preserves the valve and valve seat in all cases, and where a needle valve 51 is used, as in Fig. 4, said nut prevents said valve becoming stuck in its seat 52 and also when properly adjusted functions to prevent seating of the valve 51 on the seat 52 even when the diaphragm 29 is operated by higher pressure; thereby making provision for the passage of a comparatively small amount of fuel to maintain a small flame without the use of a pilot light. Adjustments of the nuts 45, 47, 49 may be readily made without otherwise disturbing the device by reason of the yoke 25 being open at two of its sides so as to permit the insertion of a wrench or the like, not shown, to turn said nuts. From this it is clear that the open sided yoke 25 serves two very important functions, that of disclosing leakage and that of permitting adjustment without it being necessary to detach the various elements from one another. It will also be noticed by inspection of the figures that certain guides are provided for the stem 36, and these guides are shown at 53, 54 and 55 in diaphragm chambers 21 and 23 and in valve chamber 10, respectively. Said stem passes freely through said guides, but fits them nicely so as to have an easy motion, which is exactly restrained along the axis 24. The stem 36 being thus capable of a very little or no play at all, it becomes desirable to mount valve 39 on the stem 36 through a flexible universal joint, shown in the form of a ball and socket connection 56, Fig. 3. By this provision the valve will be free to accommodate itself perfectly onto the valve seat 40 when thrust upon the same, and will be independent of any discrepancy in the alinement between the stem and the valve seat. It will be further noticed that some provision should be made so as to prevent the escape of any fuel which may pass from the valve chamber through the passage in guide 55 through which the stem passes into the valve chamber. After a fashion this provision may, of course, be accomplished by an ordinary stuffing-box, but a construction of this type is open to the objection that it may bind the stem and prevent the proper response of same to pressure fluctuation, and may consequently impair the delicacy and reliability of the regulator considerably. In the construction shown in the figures, however, the above provision is attained without encountering the objection just referred to. The impervious diaphragm 30 spanning the bowl 33 and forming a gas tight joint with same all around its perimeter, and also forming a gas tight joint 38 with the stem, serves to trap any fuel that might have issued through guide 55. The further escape of such fuel is, of course, prevented, and diaphragm 30 being movable in unison with the diaphragm 29, the former gives ideal service in the capacity referred to.

It has been previously stated that when a liquid fuel is used instead of a gaseous fuel a needle valve, such as is shown in Fig. 4, is used in preference to the valve shown in Fig. 3. In addition to this change, it may be advisable to invert the regulator from the position shown in the figures, so that the valve chamber 10 is at the bottom of the regulator. In this event, there is always a tendency for the liquid fuel to drain out of the valve chamber, either through the outlet pipe 9 or through the inlet pipe 12, which will lead downward from the valve chamber in the modification just suggested. On account of this tendency, the valve chamber will not trap the fuel, and during inactive periods said chamber will be free of said fuel. Otherwise, the construction, operation and behavior of the regulator for liquid fuel is identical with the regulator for gaseous fuel.

As an additional modification of the regulator as hereinbefore described, the same may be provided with a by-pass 57, Fig. 3, which leads from the inlet passage 41 into the valve chamber 10, and which is never shut off by the valve 39. This by-pass 57 is useful with certain types of burners which do not light up readily under the action of the pilot light. These burners must never be extinguished, therefore, and the slight amount of gas which is by-passed to them through passage 57 serves to keep them burning low, even when the valve is driven up onto its seat. For purposes of adjustment, a needle valve 58 may be directed into said by-pass as shown in Fig. 3.

From the foregoing detailed description it is believed that the construction, operation and adjustments of the regulator will be clear, but it will be understood that said regulator is not limited to a steam heating system or to any other system, but is of utility wherever gaseous or liquid fuel is to be controlled by and in accordance with pressure fluctuations in some gaseous or fluid medium.

In conclusion, further illustration of the use of said regulator may be had by reference to Fig. 2, which shows an automatic heating system. In this figure the service cock 59 may be used in conjunction with a sink, a wash-bowl, a bath-tub, etc., and is connected through pipe 60, heating coil 61, and pipe 62 to the general water supply 63. The heating coil 61 is located in an ordinary water heater 64, which is also provided with a gas burner 65 and a pilot light 66 which is fed by the separate gas line 67. The burner 65 receives its gas through the pipe 68, valve chamber 10, and the main gas supply 69. The pipe 70 connects the regulator 11 to some suitable part of the water supply circuit, such as pipe 62, and the fluid pressure of said water supply is thereby transmitted into the diaphragm chamber 21 of the regulator. In the operation of this system the fluid pressure is maximum when the service cock 59 is shut off, so that the pressure of diaphragm 29, Fig. 3, is maximum, and serves to force valve 39 onto its seat 40. At this time the burner 65 will, of course, be inactive. When the service cock 59 is opened, however, the fluid pressure drops all through the water circuit, and the pressure on diaphragm 29 being reduced the valve 39 will be lowered so as to permit gaseous fuel to pass freely into burner 65. The pilot light 66 will ignite said fuel as it issues from the burner, and the heat of the flame so created will warm the water in coil 61, so as to supply hot water out of the service cock 59. So long as the service cock 59 is open, gas will be supplied to the burner and the heat of same will cause hot water to issue from the cock; but when said service is closed, the maximum fluid pressure is reëstablished and the valve 39 of the regulator is again raised, so as to discontinue the fuel supply. The burner flame will then be extinguished, and the system will lie dormant until the service cock is again reopened. From this it is seen that water is heated whenever demand is made at the cock, and that by extinguishing the burner at other times fuel economy is effected.

I claim:—

1. In a regulator, a valve chamber, a driven diaphragm chamber connected to one side of the valve chamber, a yoke connected at one end to the opposite side of the driven diaphragm chamber, a driving diaphragm chamber connected to the opposite end of the yoke, a driving diaphragm in the driving diaphragm chamber, a valve stem connected to the driving diaphragm and extending through the yoke and through the driven diaphragm chamber into the valve chamber, a driven diaphragm upon the valve stem in the driven diaphragm chamber and serving as a stuffing box for the stem in the valve chamber, a valve seat in the valve chamber, a valve upon the valve stem for the seat, a spring seat in the yoke and spaced apart from the driven diaphragm chamber, a spring upon the valve stem against the spring seat for moving the valve away from the valve seat, the driven diaphragm chamber forming a rigid stop, and an adjustable stop upon the valve stem between the spring seat and the rigid stop to engage the rigid stop and limit the movement of the valve toward the seat.

2. In a regulator, a valve chamber, a driven diaphragm chamber connected to one side of the valve chamber, a yoke connected at one end to the opposite side of the driven diaphragm chamber, a driving diaphragm chamber connected to the opposite end of the yoke, a driving diaphragm in the driving diaphragm chamber, a valve stem connected to the driving diaphragm and extending through the yoke and through the driven diaphragm chamber into the valve chamber, a driven diaphragm upon the valve stem in the driven diaphragm chamber and serving as a stuffing box for the stem in the valve chamber, a valve seat in the valve chamber, a valve upon the valve stem for the seat, a spring seat in the yoke and spaced apart from the driven diaphragm chamber, a spring upon the valve stem against the spring seat for moving the valve away from the valve seat, the driven diaphragm chamber forming a rigid stop, an adjustable stop upon the valve stem between the spring seat and the rigid stop to engage the rigid stop and limit the movement of the valve toward the seat, a nut upon the valve stem for adjusting the tension of the spring, the driven diaphragm chamber forming a second rigid stop, and a second adjustable stop upon the valve stem to engage the second rigid stop and limit the movement of the valve away from the valve seat.

In testimony whereof, I have hereunto set my hand at Los Angeles, California, this 11th day of April, 1913.

ALFRED H. THOMPSON.

In presence of—
JAMES R. TOWNSEND,
ROBERT A. STEPS.

Copies of this patent may be obtained for five cents each, by addressing the "Commissioner of Patents, Washington, D. C."